Nov. 21, 1950     R. M. COLEMAN ET AL     2,530,861
SELECTIVE PASSENGER REGISTRATION METER FOR TAXICABS
Filed Sept. 11, 1946     2 Sheets-Sheet 1

INVENTORS:
Ralph M. Coleman
Caleb H. La Mar
Hayard N. Robertson

_Patented Nov. 21, 1950_

2,530,861

UNITED STATES PATENT OFFICE 2,530,861

SELECTIVE PASSENGER REGISTRATION METER FOR TAXICABS

Ralph Monroe Coleman, Caleb H. La Mar, and Hazard N. Robertson, El Paso, Tex.

Application September 11, 1946, Serial No. 696,132

1 Claim. (Cl. 235—30)

Our present invention relates to an improved meter for taxicabs and more particularly to a meter designed to register the fare of several passengers, separately, in order that the owner of the cab may have an accurate record of the distance travelled by each passenger, where more than one person is carried, and the fare of each passenger.

In the accompanying drawings we have illustrated one complete example of the physical embodiment of our invention according to the best mode we have thus far devised, but it will be understood that various changes and alterations may be made in the exemplified structure within the scope of the appended claim.

Figure 1:
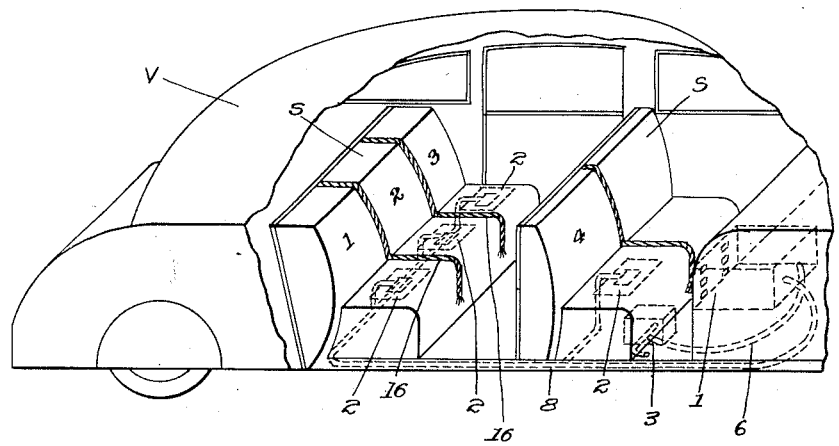
Figure 1 is an interior view of a taxicab showing the position of the parts comprising the invention therein.

Referring now to the drawings wherein like characters indicate like parts we have illustrated the present embodiment of our invention as comprising a recording unit designated generally as 1 recording and registering the distance of travel of the cab and the amount of fare of each passenger. The relay contact switch is generally designated as 2 and is closed when a passenger is seated thereon to actuate the unit 1 through wire 8. The power connection 3 secures the cable 6 to the unit and a battery, not shown, provides electrical supply to the unit 1.

In Figure 1 we have shown the arrangement of the relay switches 2 positioned under the seats of the vehicle V sectioned by cords 16 to indicate where the passengers should sit.

Figure 2:
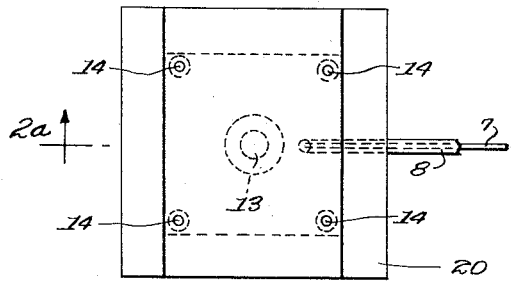
Fig. 2 is a top plan view of a seat relay switch.
Figure 2A:
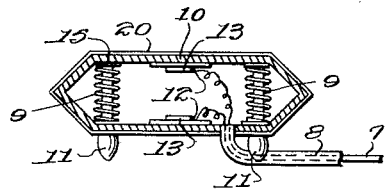
Fig. 2a is a sectional view of the switch on the line 2a—2a of Fig. 2.
Figure 2B:
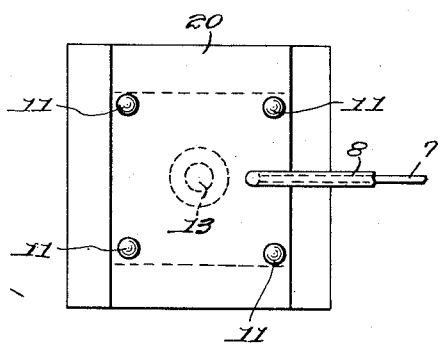
Fig. 2b is a bottom plan view of Fig. 2.

Figures 2, 2a and 2b disclose detailed top plan, bottom plan, and sectional views of the relay switch 2. A heavy electrical conduit 8 from the relay switch 2 to the unit 1 includes the wires 7 used in this connection, and these wires have a condenser, not shown in the circuit to minimize all sparking conditions. Each seat is provided with a square envelope-like member formed from upper and lower sheets of asbestos material 20. The sheets are biased to a separated position by springs 9 for breaking the electrical connection, in a manner to appear, when a passenger in the car gets out of the seat. Sewed or otherwise fastened to the inside of the asbestos fabric material 20 are spaced copper discs 13 which form contact or terminal points for the wires 7. Posts 11 guide the movement of the springs 9, the posts passing through guide holes 14 in the lower sheet 20. When a passenger sits on a seat, the weight of his body causes the envelope-like member to collapse causing the discs 13 to come together, complete the circuit for wires 7 for electrical operation of units 1, as hereinafter described.

Figure 3:
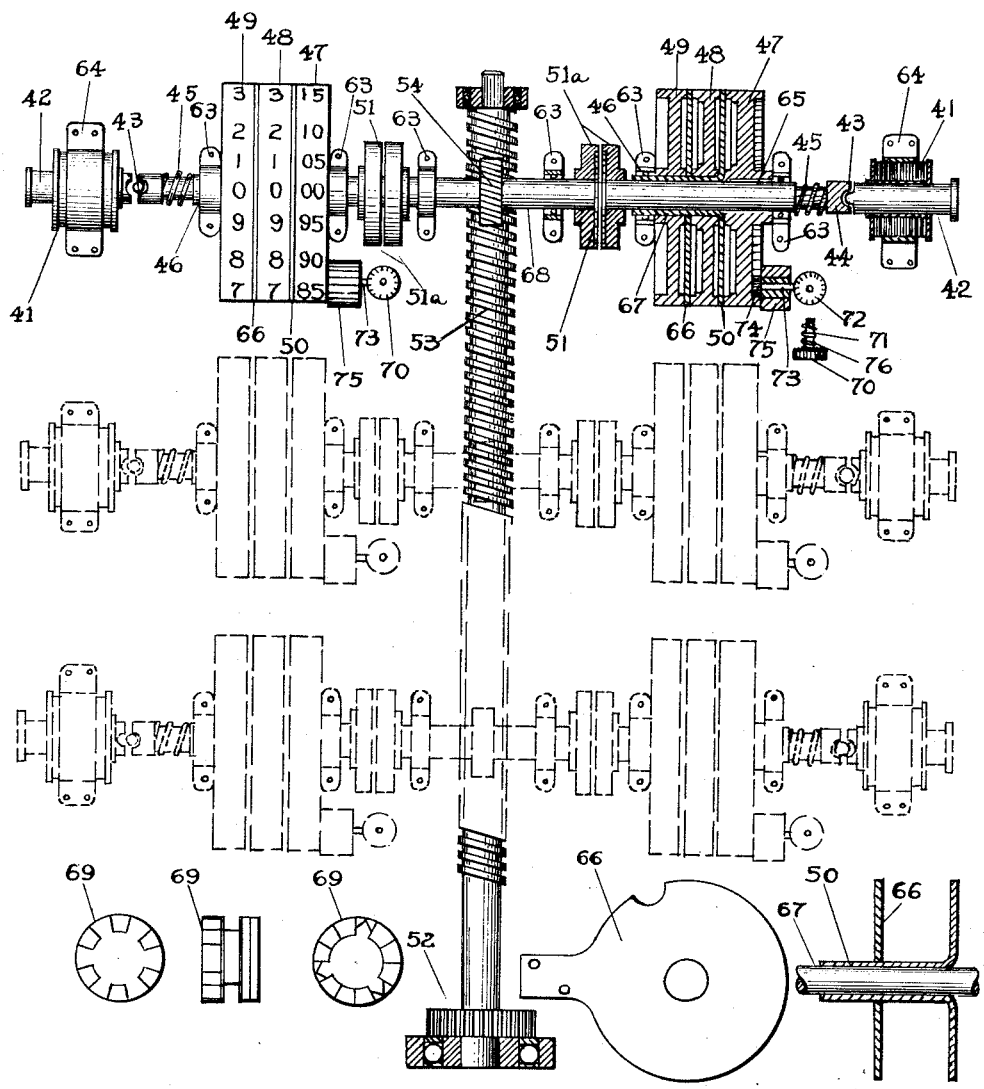
Figure 3 is a front view of the mechanical and electrical mechanism partially sectioned to show the details of the counting wheels, friction clutch, and the solenoids.

In Figure 3 is shown, by detailed illustration the operating principle of the units mounted in the front part of the recording unit. Number 53 is the shaft which extends to the top of the unit and is run by the gear 52. To this shaft 53 is secured a worm gear for driving gears 54, which in turn run the shafts 68. On each end of this shaft is mounted one half of the clutch unit 51, which clutch units have a cork clutch face made into the assembly for turning the other half of the clutch 51a. The shafts are mounted in roller bearings 46 and secured to the unit frame by clamps 63. The clutch half 51 does not engage until the solenoid 41 is energized by the passenger sitting down on the contact unit 2, located under the cushion upholstering. When the contact discs 13 of unit 2, Figure 1, have made connection, the solenoid 41 is energized causing the center of the solenoid shaft 42 to shift, pushing the floating shaft 67 through the stationary shaft 56, causing the clutch units 51 and 51a to engage. When solenoids 41 are energized, shaft 42 contacts free ball bearing 43, incorporated to eliminate friction between shafts 42 and 67. The shaft 67 has a key 65 incorporated in it which fits into the right wheel 47, to make it turn with the shaft when it is turned by engaging with the clutch. When the solenoid unit is not energized, the spring 45 will disengage the clutch and let the counting unit stop. The six counting units consist of three detachable counting discs or wheels that can be adapted to the local conditions of the cities concerned. These counting wheels are 47, 48 and 49. They are alike in construction with the exception of the numberings on the face. The numbering on the face of the counting wheels will be adapted to the locality in which they will be used. The counting wheels 47 will make one complete revolution and at the completion of this revolution will engage with gear 69 located inside the outside band of wheels 47, causing gear 69 to turn 120 degrees. The teeth on the opposite end of the gear will mesh with the teeth on the inside of the counting wheel 48, causing it to move up one of the numbers on the face of the counting wheel. Gear 69 is so constructed that it will only allow the counting wheel 48 to move up one of the recording numbers at a time with each revolution of the wheel 47. Counting wheel 49, is constructed in the same way in that it will only move up one of the counting numbers with one revolution of the counting wheel 48. Gear 69 is held in position and in mesh with the teeth of the counting wheel by the bracket 59, and is held in position between counting wheel 48 and 49 by the plate 66 which fits on the shaft 50. Each one of the individual units are operated in the same way and operate only when the switch 2 is closed by someone occupying a seat and when the cab is in motion. Each of the solenoids is held in position by the clamp 64, which is anchored to the main unit, 1, by screws and is removable for repairs or installation of new parts. Counting wheels 47 may be operated manually by use of gears 74, which mesh with teeth inside wheels 47, for returning the counting wheels to zero after a passenger leaves the cab. Gear 74 is turned by shaft 73, which has beveled gear 71, which meshes with bevel gear 72, which in turn is operated manually by knurled knobs 70, when springs 76 are depressed. Springs 76 disengage bevel gears 71, when the unit is being operated by the operation of the cab.

Having thus fully described our invention what we claim as new and desire to secure by Letters Patent is:

In a fare registering mechanism for a vehicle, having a plurality of seats and, an electrical switch under each seat adapted to be closed by the weight of an occupant in a respective seat, the improvement comprising a main shaft, means connected to the vehicle for driving said main shaft during travel of the vehicle, worm gear means on said main shaft, a plurality of cross shafts extending at right angles to said main shaft, gearing means between each said cross shaft and said worm gear means, a driving clutch member terminating the end of each said cross shaft, a fare registering unit for each of said seats, respectively, support means mounting each said unit in axial alignment with each cross shaft, respectively, a driven shaft at each side of a cross shaft, means slidably keying each said driven shaft through each respective fare registering unit for driving the same, a cooperating driven clutch member on one end of each driven shaft adapted to engage a respective driving clutch member on each cross shaft, an anti-friction unit on the opposite end of each driven shaft, spring means between each said anti-friction unit and each said support means to bias the respective driven shaft and driven clutch member thereon away from its respective driving clutch member, a solenoid means adapted to engage each anti-friction unit, respectively, electrical means connecting said seat switches to said respective solenoid means whereby upon a seat being occupied, the weight of the occupant will move said switch to a circuit closing position for energizing the respective solenoid means causing the same to move a driven shaft into engagement axially, thereby forcing the respective driving and driven clutch members together for actuating a fare registering unit in proportion to the distance travelled by the occupant during travel of vehicle.

RALPH MONROE COLEMAN.
CALEB H. LA MAR.
HAZARD N. ROBERTSON.

REFERENCES CITED

The following references are of record in the file of this patent:

UNITED STATES PATENTS

| Number | Name | Date |
|---|---|---|
| 387,936 | West | Aug. 14, 1888 |
| 480,526 | Squires | Aug. 9, 1892 |
| 1,271,920 | Maxwell | July 9, 1918 |
| 1,993,428 | Abrell et al. | Mar. 5, 1935 |

FOREIGN PATENTS

| Number | Country | Date |
|---|---|---|
| 352,479 | Great Britain | July 7, 1931 |